(12) United States Patent
Hilmi et al.

(10) Patent No.: US 8,062,779 B2
(45) Date of Patent: Nov. 22, 2011

(54) ANODE FOR USE IN A FUEL CELL AND METHOD FOR MAKING SAME

(75) Inventors: Abdelkader Hilmi, Danbury, CT (US);
Chao-Yi Yuh, New Milford, CT (US);
Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 339 days.

(21) Appl. No.: 11/538,922

(22) Filed: Oct. 5, 2006

(65) Prior Publication Data
US 2008/0085442 A1  Apr. 10, 2008

(51) Int. Cl.
*H01M 8/02* (2006.01)
*H01M 4/02* (2006.01)

(52) U.S. Cl. .......... 429/34; 429/464; 429/472; 429/532

(58) Field of Classification Search .................. None
See application file for complete search history.

(56) References Cited

U.S. PATENT DOCUMENTS

| | | | |
|---|---|---|---|
| 4,247,604 A | | 1/1981 | Marianowski et al. |
| 4,714,586 A | * | 12/1987 | Swarr et al. ........................ 419/2 |
| 5,229,221 A | * | 7/1993 | Donado et al. .................. 429/13 |
| 5,415,833 A | | 5/1995 | Kweon et al. |
| 5,478,663 A | * | 12/1995 | Cipollini et al. ................ 429/35 |
| 6,379,833 B1 | * | 4/2002 | Hill et al. ........................ 429/34 |
| 2003/0096155 A1 | * | 5/2003 | Hong et al. ...................... 429/41 |
| 2003/0170539 A1 | * | 9/2003 | Schoonmaker et al. ...... 429/217 |
| 2007/0243451 A1 | * | 10/2007 | Yuh ................................. 429/44 |

FOREIGN PATENT DOCUMENTS

KR  2003-0036964 A  *  5/2003

OTHER PUBLICATIONS

Yun-Sung Kim, et al., Creep characteristics of porous Ni/Ni3Al anodes for molten carbonate fuel cells, Journal of Power Sources, vol. 99, Issue 1-2, pp. 26-33 (Aug. 2001).
E.R. Hwang, et al., Effect of alloying elements on the copper base anode for molten carbonate fuel cells, Journal of Power Sources, vol. 69, Issue 1-2, pp. 55-60 (Nov.-Dec. 1997).
C.D. Iacovangelo, Stability of Molten Carbonate Fuel Cell Nickel Anodes, J. Electrochem. Soc., vol. 133, Issue 11, pp. 2410-2416 (Nov. 1986).

* cited by examiner

*Primary Examiner* — Ula C. Ruddock
*Assistant Examiner* — Alix Echelmeyer
(74) *Attorney, Agent, or Firm* — Cowan, Liebowitz & Latman, PC

(57) ABSTRACT

A method of making an anode element for use in a fuel cell, comprising providing a first amount of Ni—Al alloy material having a predetermined aluminum content, providing a second amount of Ni—Cr alloy material having a predetermined chromium content, providing at least one additive component, mixing the Ni—Al alloy material, the Ni—Cr alloy material and the at least one additive component to produce a slurry and forming the slurry into the anode element.

17 Claims, 4 Drawing Sheets

ANODE FOR USE IN A FUEL CELL AND METHOD FOR MAKING SAME

BACKGROUND OF THE INVENTION

This invention relates to fuel cells and, in particular, to an electrolyte matrix for use in molten carbonate fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Molten carbonate fuel cells ("MCFCs") operate by passing a reactant fuel gas through the anode, while oxidizing gas is passed through the cathode. The anode and the cathode of MCFCs are isolated from one another by a porous electrolyte matrix which is saturated with carbonate electrolyte. Molten carbonate fuel cell performance and operating life are dependent in part on the characteristics of the anode and the cathode employed in the fuel cell. For example, fuel cell anodes must have a sufficient capacity for electrolyte retention, high mechanical strength and durability.

Most commonly used fuel cell anodes comprise a nickel (Ni) based alloy, such as Ni—Cr or Ni—Al. Aluminum and chromium are commonly used to improve the mechanical strength and durability of the anode so as to reduce creeping of the anode electrode and to improve its wettability. For example, U.S. Pat. No. 4,714,586 discloses preparation of Ni—Cr anodes for use in MCFCs by uniformly mixing Ni and Cr powders, sintering the Ni and Cr mixture at 1000-1100° C. to produce a porous Ni—Cr plaque and exposing the plaque to an oxidizing environment at elevated temperatures to sufficiently oxidize the chromium in the alloy. Although the resulting Ni—Cr alloy anodes exhibit high creep resistance, these anodes nevertheless exhibit reduced performance due to development of an excessive number of sub-micron pores in the anode during the first 200 hours of operation. The presence of sub-micron pores in the anode enhances electrolyte retention within the anode. However, development of an excessive number of sub-micron pores can result in electrolyte flooding due to excessive storage of electrolyte in the pores which can cause an increased gas diffusion resistance. Moreover, testing of sintered Ni—Cr anodes after about 4000 hours of operation in MCFCs showed that these electrodes can lose their strength and become soft.

In contrast, anode electrodes formed from Ni—Al alloys have been shown to exhibit improved wettability and high creep resistance. Also, anodes formed from Ni—Al alloys do not develop sub-micron pores during operation in MCFCs, and therefore have a significantly lower electrolyte storage capacity than the Ni—Cr anodes. Insufficient electrolyte retention in the anode can increase interface resistance between the anode and the electrolyte matrix and can negatively affect the performance of the fuel cell, which, in turn, can have a negative effect on the operating life of the MCFC.

U.S. Pat. No. 5,415,833 discloses a further anode formed from a Ni—AlCr alloy to realize a reduced amount of creep. In the method of this patent several heat treatments at elevated temperatures, e.g. 800° C., and special atmospheres were used to fabricate the electrode. The patent also mentions the use of about 6% combined Al and Cr in the Ni—AlCr anode, with the ratio of Al to Cr being 4 to 1.

Accordingly, an anode having an optimized pore structure to enhance electrolyte retention in the pores of the anode without affecting gas diffusion into the pores is desired. In addition, a method for manufacturing such anodes that is simple and does not require multiple steps to be performed at increased temperatures is also desired, so as to reduce manufacturing costs and to avoid brittleness of the anode resulting from the use of high temperatures.

It is therefore an object of the present invention to provide an anode with an improved pore structure which allows for sufficient electrolyte retention without causing electrolyte flooding and reducing gas diffusion into the pores of the anode.

It is a further object of the present invention to provide a method of preparing an anode with improved pore structure which does not require heating or sintering of the anode at high temperatures.

It is also an object of the present invention to provide a method of preparing an anode with improved pore structure which is simple to perform and is cost effective.

SUMMARY OF THE INVENTION

In accordance with the principles of the present invention, the above and other objectives are realized in a method of making an anode element for use in a fuel cell comprising providing a first amount of Ni—Al alloy material having a predetermined aluminum content, providing a second amount of Ni—Cr alloy material having a predetermined chromium content, providing at least one additive component, mixing the Ni—Al alloy material, the Ni—Cr material and the at least one additive component to produce a slurry and forming the slurry into the anode element. The Ni—Al alloy material has aluminum content between 2 and 4 weight %, while the Ni—Cr alloy material has chromium content between 2 and 15 weight %. In certain illustrative embodiments, the Ni—Al alloy material comprises Ni-3Al alloy powder and the Ni—Cr alloy material comprises Ni-4Cr alloy powder.

The first amount of the Ni—Al material is between 70 and 95 weight % of a total alloy weight, and the second amount of the Ni—Cr material is between 5 and 30 weight % of the total alloy weight. In certain illustrative embodiments, the Ni—Al alloy material comprises a powder having a mean particle size of 20 μm, and the Ni—Cr alloy material comprises a powder having a mean particle size between 5 μm and 15 μm.

In certain embodiments, the at least one additive component provided comprises at least one of a binder and a plasticizer. In addition, the at least one additive component may be mixed with a dispersant and/or a solvent before being mixed with the Ni—Al alloy material and the Ni—Cr alloy material to produce a slurry. In the illustrative embodiments herein, the binder comprises an acryloid binder, the plasticizer comprises Santicizer® plasticizer, the dispersant comprises fish oil and the solvent comprises reagent alcohol.

The mixing of the Ni—Al alloy material, the Ni—Cr alloy material and the at least one additive component is performed using ball milling for 5 to 10 hours or using a blender for 0.5 hours. The forming of the slurry into the anode element comprises tape casting the slurry at a predetermined thickness, such as 6.5 to 7 mils, and drying the slurry at room temperature.

An anode element formed from the Ni—Al and Ni—Cr alloy materials and a fuel cell, such as a molten carbonate fuel cell, using the anode formed from Ni—Al and Ni—Cr alloy materials are also disclosed.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
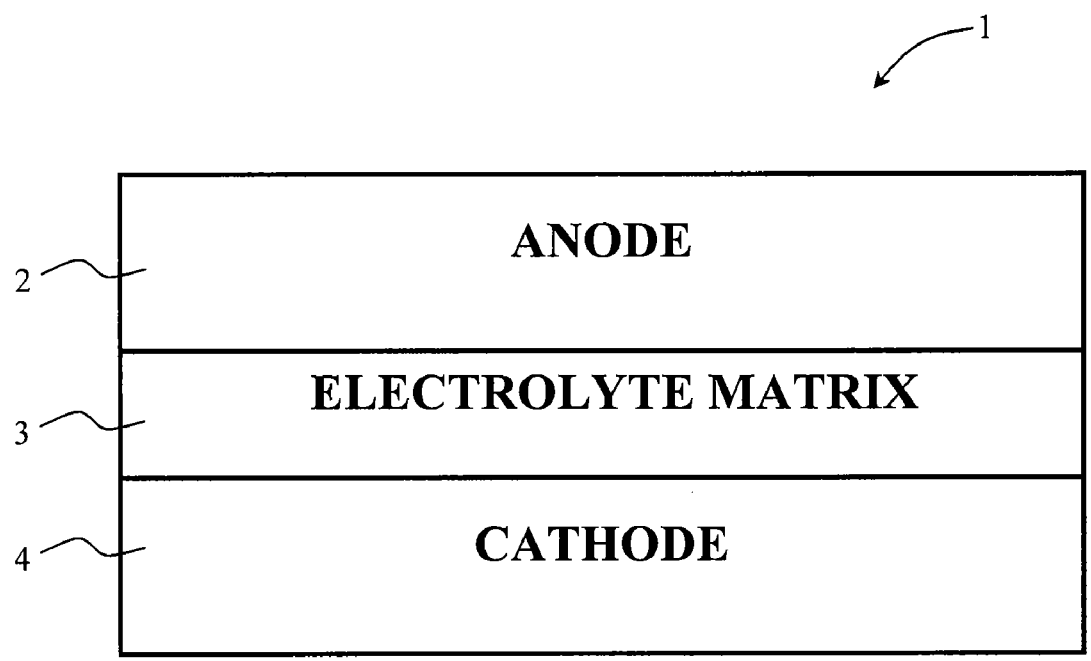
FIG. 1 shows a molten carbonate fuel cell including an anode.

FIG. 1 shows a molten carbonate fuel cell 1 including an anode 2, a cathode 4 and an electrolyte matrix 3 separating the anode 2 and the cathode 4 from one another. During operation of the fuel cell 1, fuel gas is fed to the anode 2 and oxidant gas is fed to the cathode 4. In the fuel cell 1, these gases undergo an electrochemical reaction in the presence of molten carbonate electrolyte present in the pores of the electrolyte matrix 3.

The anode comprises a porous anode element formed from a Ni—Al alloy and a Ni—Cr alloy. The Ni—Al alloy has aluminum content between 2 and 4 weight %, while the Ni—Cr alloy has chromium content between 2 and 15 weight %, and preferably between 2 and 5 weight %. The Ni—Al alloy and the Ni—Cr alloy forming the anode 2 each have a predetermined particle size. The alloy amounts of Ni—Al and Ni—Cr alloys in the anode 2 may vary. In this illustrative embodiment, the Ni—Cr alloy is between 5 and 30 weight % of the total alloy weight in the anode, and the Ni—Al alloy is between 70 and 95 weight % of the total alloy weight in the anode. The anode 2 may also include additive materials such as a binder and a plasticizer. It is understood that other additive materials may also be suitable for use in the anode 2 of the fuel cell.

During operation of the fuel cell, small pores are formed in the anode 2 due to an oxidation/lithiation reaction of the chromium in the Ni—Cr alloy with carbonate electrolyte from the matrix to form $LiCrO_2$. As discussed in more detail herein below, the formation of the small pores improves the electrolyte storage capability of the anode. Moreover, as also discussed in more detail below, the combination of the Ni—Cr and Ni—Al alloys in the anode results in a balanced pore structure which allows formation of small pores without resulting in electrolyte flooding of the anode and without negatively affecting the interface between the anode and the matrix in the fuel cell.

Figure 2:
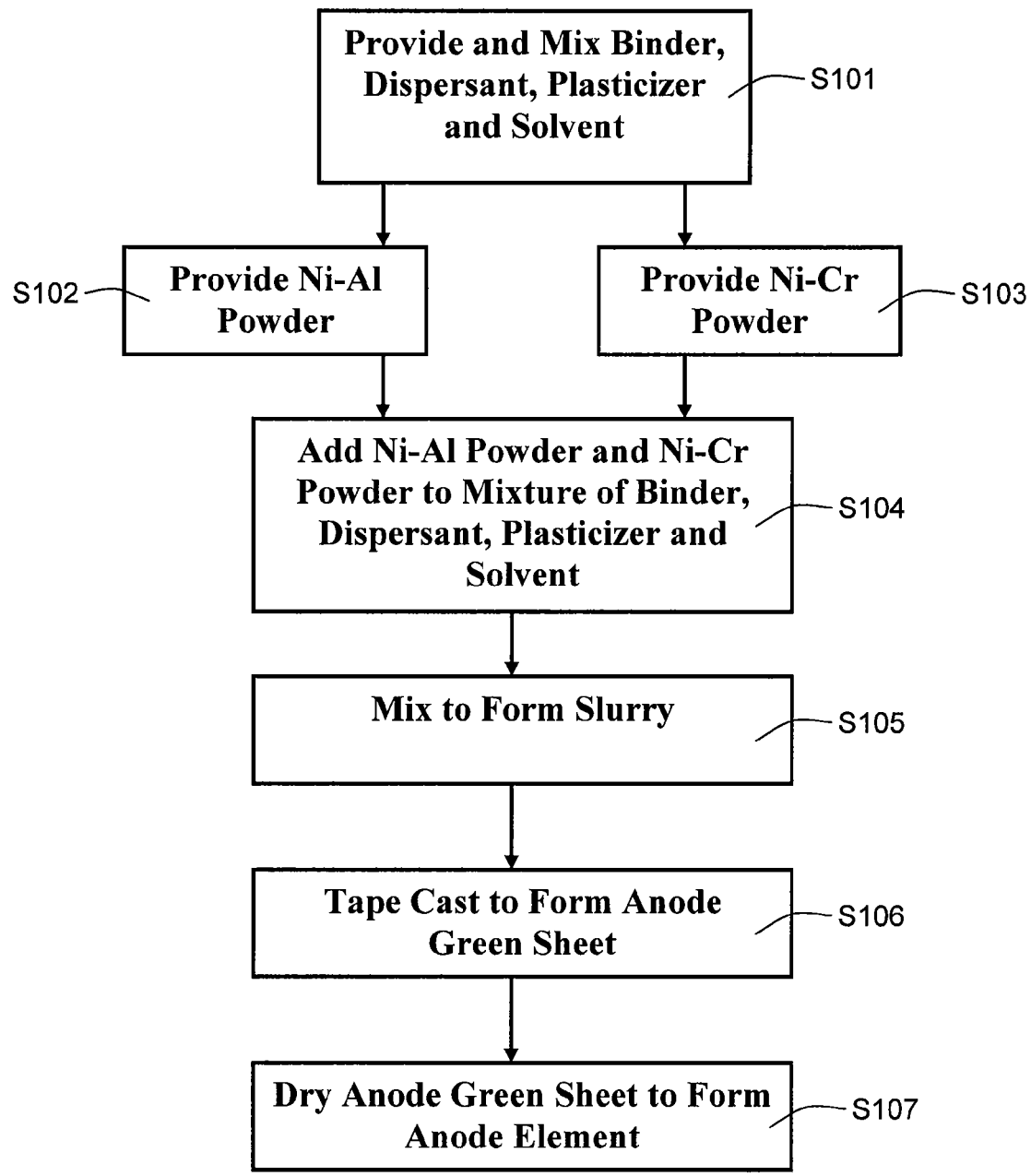
FIG. 2 shows a flow diagram of a method of fabricating the anode of FIG. 1.

FIG. 2 shows a flow diagram of a method for fabricating the anode 2 of FIG. 1. As shown in FIG. 2, in the first step S101, additive materials are provided and are uniformly mixed in a presence of a solvent. As discussed above, additive materials include a binder, such as an acryloid binder, and a plasticizer, such as Santicizer® plasticizer. Reagent alcohol is suitable for use as the solvent. In addition, a dispersant, such as fish oil, may be used to assist in dispersing the component particles uniformly throughout the mixture. Mixing of the additive materials, dispersant and solvent is carried out using any suitable conventional method. For example, ball milling for a predetermined time period using grinding media having a pre-selected size is a suitable mixing technique.

In the second step S102, Ni—Al alloy powder is provided, and in the third step S103, Ni—Cr alloy powder is provided. As discussed above, the amount of aluminum in the Ni—Al powder is preferably between 2 and 5 weight %. In this illustrative embodiment, Ni-3Al powder, having 3 weight % of aluminum content, is suitable for use in fabricating the anode. The Ni—Al alloy powder should also have a predetermined mean particle size. In this illustrative embodiment, the mean particle size of the Ni—Al alloy powder is about 20 μm, but it can range from 10 μm to 45 μm.

The Ni—Cr alloy powder provided in step S103 has chromium content between 2 and 15 weight %. In particular, Ni—Cr powder having 3.8 to 4 weight % of chromium is suitable for use in this illustrative embodiment. The mean particle size of the Ni—Cr powder can be in a range from 5 μm and 15 μm. In this illustrative embodiment, Ni—Cr powder having mean particle size of about 15 μm is used in fabricating the anode. However, Ni—Cr powder having a range from 10 to 15 μm can also be used. Additionally, to realize a desired smaller pore structure, Ni—Cr powder having a smaller mean particle size of between 5 and 10 μm may be used.

The amount of Ni—Cr powder provided in step S103 is between 5 weight % and 30 weight % of the total alloy powder, and is preferably between 15 and 25 weight % of the total alloy powder, while the amount of Ni—Al powder provided in step S102 is between 70 weight % and 95 weight % of the total alloy powder, and preferably between 75 and 85 weight % of the total alloy powder.

In the next step S104 shown in FIG. 2, the Ni—Al alloy powder provided in the second step S102 and the Ni—Cr alloy powder provided in the third step S103 are added to the mixture of the additive materials, dispersant and solvent prepared in the first step S101. The resulting mixture of the Ni—Al and Ni—Cr alloy powders, additive materials, dispersant and solvent is then mixed in step S105 to form a slurry. The mixing in step S105 is performed using any suitable conventional mixing technique for a time period sufficient to produce a uniform slurry mixture. For example, a ball milling technique may be used to mix the mixture for 5 to 10 hours. In the alternative, the mixture may be mixed in a blender for about 0.5 hours.

Following the mixing in step S105, the slurry is tape cast at a predetermined thickness in a sixth step S106 to form an anode green sheet. In this illustrative embodiment, the predetermined thickness is about 6.5 to 7 mils. However, the thickness and other dimensions of the anode green sheet may vary depending on the requirements of the fuel cell.

The anode green sheet formed in the sixth step S106 is thereafter dried at room temperature in step S107 to evaporate the solvent from the green sheet and to form the anode. The completed anode comprises Ni—Al and Ni—Cr alloys held together as a porous element by the binder material. The completed anode has a predetermined porosity, preferably about 50 to 60%. As discussed above, when the anode is used in the fuel cell, additional sub-micron pores are formed throughout the anode due to the oxidation/lithiation reaction of the chromium in Ni—Cr to form $LiCrO_2$.

The optimal components and fabrication of the anode using the above method will be dependent on the particular application and requirements of the fuel cell. An illustrative example of fabricating an anode is described herein below.

EXAMPLE 1

In this illustrative example, anodes having 80 weight % of Ni-3Al and 20 weight % of Ni-4Cr are prepared using the method shown in FIG. 2 and described above. In the first step S101, additive components comprising acryloid binder and Santicizer® plasticizer, and the dispersant comprising fish oil are dissolved and mixed in the presence of the reagent alcohol solvent. The amounts of binder, Santicizer® plasticizer, dispersant and solvent are approximately 12.1 wt % of the slurry mixture (the slurry mixture is defined as the mixture of 80 weight % Ni-3Al and 20 weight % of Ni-4Cr and additive components comprising binder, Santicizer® plasticizer, dispersant and solvent). The mixture of additive components, dispersant and reagent alcohol is mixed using the ball milling technique overnight, or for time period sufficient to achieve a uniform mixture.

In the second step S102, a first predetermined amount of Ni—Al alloy powder is provided and in the third step S103, a second predetermined amount of Ni—Cr allow powder is provided. In this illustrative embodiment, the Ni—Al alloy powder comprises Ni-3Al alloy powder having 3 weight % of aluminum in the alloy, and the Ni—Cr alloy powder comprises Ni-4Cr alloy powder having 4 weight % of chromium in the alloy. The first predetermined amount of Ni-3Al is 80 weight % of the total weight of Ni-3Al and Ni-4Cr alloy powders, while the second predetermined amount of Ni-4Cr is 20 weight % of the total alloy weight. The Ni-3Al powder used in this illustrative example has a mean particle size of 20 μm, and the mean particle size of Ni-4Cr powder used in this example is about 15 μm.

In the fourth step S104, the Ni-3Al powder provided in the second step S102 and the Ni-4Cr powder provided in the third step S103 are added to the mixture of additive materials, fish oil and reagent alcohol solvent, formed in the first step S101, and are then mixed in step S105 to form a slurry. The mixing in step S105 is performed by mixing the Ni-3Al and Ni-4Cr powders with the mixture from step S101 using a blender for about 0.5 hours or for a time period sufficient to achieve a uniform dispersion of the alloy powders throughout the mixture. In the alternative, the mixing in step S105 may be carried out using the conventional ball milling technique for 5 to 10 hours, or for a time period sufficient to uniformly disperse the alloy powders throughout the mixture.

In the sixth step S106, an anode green sheet is formed by tape casting the slurry prepared in step S105 at a predetermined thickness. In this illustrative example, the slurry is tape cast at a thickness of 6.5 to 7 mils. The anode green sheet is allowed to dry at room temperature in step S107 to remove reagent alcohol and to form the anode.

The method of Example 1 was used to form anode elements for use in single cells having an area of 250 cm$^2$ and anode elements for use in button cells having an area of 3 cm$^2$. Anodes fabricated using the method of Example 1 from 80 weight % Ni-3Al alloy powder and 20 weight % Ni-4Cr alloy powder (hereinafter "wt % Ni-3Al/20 wt % Ni-4Cr anodes") for use in single cells were tested to determine their pore structure before and after being used in a fuel cell operation. Anodes formed from Ni-3Al alloy powder without the use of Ni-4Cr (hereinafter "100 wt % Ni-3Al anodes") were also tested to determine their pore structure before and after being used in a fuel cell operation and to compare their pore structure to that of the 80 wt % Ni-3Al/20 wt % Ni-4Cr anodes. The 100 wt % Ni-3Al anodes were fabricated by mixing 100 wt % Ni-3Al alloy powder with the mixture of additive materials, dispersant and solvent to form a slurry, tape casting the slurry to form a green sheet and drying the green sheet at a suitable temperature. Porosimetry was then used to determine the pore structure of the anodes before using them in a fuel cell.

After using the anodes in a fuel cell operating at a temperature of about 650° C. and a current density of 160 mA/cm$^2$, the anodes were washed with a pre-selected acidic solution to remove any electrolyte stored therein. In this illustrative embodiment, a 70/30 solution of Glacial acetic acid and anhydrous acetic acid was used to wash the anodes. The pore structure of the washed anode elements was then analyzed using porosimetry. In this illustrative embodiment, the pore structure of 80 wt % Ni-3Al/20 wt % Ni-4Cr anodes was analyzed after using these anodes in a fuel cell for about 4900 hours. The pore structure of the 100 wt % Ni-3Al anodes was analyzed after using these anodes in a fuel cell for about 1800 hours.

Figure 3:
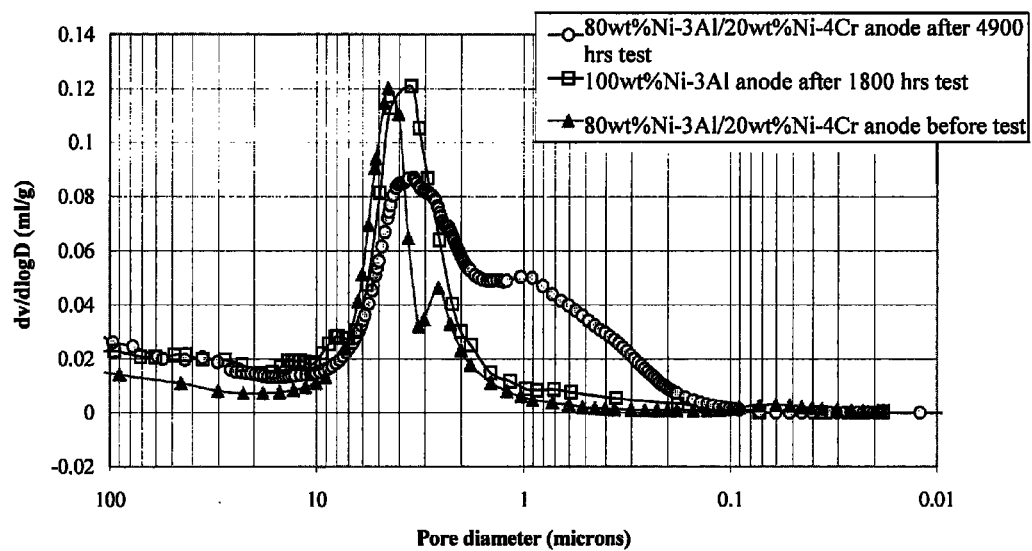
FIG. 3 shows a graph of pore size distribution data for 80 wt % Ni-3Al/20 wt % Ni-4Cr anodes fabricated using the method of FIG. 2 before and after being used in a fuel cell and a pore size distribution data for 100 wt % Ni-3Al anode after being used in a fuel cell.

FIG. 3 shows a graph of pore size distribution data obtained using the above testing for 80 wt % Ni-3Al/20 wt % Ni-4Cr anodes fabricated using the method of FIG. 2 and described above in Example 1 before and after using these anodes in fuel cell operation, and pore size distribution data for 100 wt % Ni-3Al anode elements after use in fuel cell operation. In FIG. 3, the X-axis represents the pore diameter of the anode in microns, while the Y-axis represents a log differential for the cumulative pore volume in mL/g.

As can be seen in FIG. 3, after being used in fuel cell operation for 1800 hours, 100 wt % Ni-3Al anodes had a single peak pore size distribution with the pore sizes being larger than 1 micron. As also can be seen from FIG. 3, the 100 wt % Ni-3Al anode elements did not have sub-micron pores, i.e. pores smaller than 1 micron in diameter, even after being used in a fuel cell.

As shown in FIG. 3, the 80 wt % Ni-3Al/20 wt % Ni-4Cr anodes prepared using the method of FIG. 2 had a dual-peak pore size distribution with pores ranging between 0.2 and 10 microns in size before being used in fuel cell operation. In particular, the 80 wt % Ni-3Al/20 wt % Ni-4Cr anodes had a frequent occurrence of pores having a pore size between 2 and 6 microns, with the two distribution peaks occurring at about 4.5 microns and 2.6 microns. As can be seen, the 80 wt % Ni-3Al/20 wt % Ni-4Cr anodes did not have any sub-micron pores before being used in fuel cell operation.

However, it can also be seen that after being used in fuel cell operation for 4900 hours, the pore distribution of the 80 wt % Ni-3Al/20 wt % Ni-4Cr anode elements changed so as to reduce the overall size of the pores in the anode and to develop a substantial number of sub-micron pores. As shown in FIG. 3, these 80 wt % Ni-3Al/20 wt % Ni-4Cr anodes still had a dual-peak pore size distribution, but the two distribution peaks after use in fuel cell operation occurred at 3.3 microns and 1 micron. As can also be seen, the total volume of sub-micron pores in these anodes amounted to about 10 to 15% of the total pore volume.

Although the pore size distribution in the 80 wt % Ni-3Al/20 wt % Ni-4Cr anodes changed after being used in fuel cell operation, the total porosity of these anode elements was not affected. For example, in this illustrative embodiment, the porosity of the 80 wt % Ni-3Al/20 wt % Ni-4Cr anodes before and after being used in fuel cell operation was about 50%. The formation of sub-micron pores in the 80 wt % Ni-3Al/20 wt % Ni-4Cr anodes after being used in a fuel cell improves the electrolyte retention of these anode elements.

As can be appreciated, the operating lifetime of a fuel cell is affected by a variety of factors, including loss of electrolyte, drying out of the matrix, drying out of the interface between the anode and the matrix, and the strength of the fuel cell components. The drying out of the matrix and of the anode-matrix interface due to electrolyte loss can be avoided by storing a portion of the electrolyte in the pores of the anode. Accordingly, the formation of sub-micron pores, which can store electrolyte in the 80 wt % Ni-3Al/20 wt % Ni-4Cr anodes, contributes to preventing the drying out of the matrix and of the anode-matrix interface and results in an extension of the fuel cell operating life. In addition, storage of a portion of the electrolyte in the sub-micron pores of the 80 wt % Ni-3Al/20 wt % Ni-4Cr anodes reduces electrolyte flooding in the cathode electrode, thus reducing cathode polarization and improving the fuel cell performance.

To demonstrate the improvement in the operating life of fuel cells that use the 80 wt % Ni-3Al/20 wt % Ni-4Cr anodes, as compared to fuel cells using the 100 wt % Ni-3Al anodes, the 80 wt % Ni-3Al/20 wt % Ni-4Cr and 100 wt % Ni-3Al anodes fabricated using the method of FIG. 2 and Example 1 were tested in single cells to determine electrolyte fill level, i.e. amount of electrolyte stored in the anode, in these anodes during the operating life of the fuel cell. The testing of these anodes was conducted at a temperature of 650° C., a current density of 160 mA/cm$^2$, and a 75% utilization rate. After being used in the fuel cell for a predetermined operating time period, each anode was washed to determine the amount of electrolyte stored in the anode and its electrolyte fill level was calculated.

Figure 4:
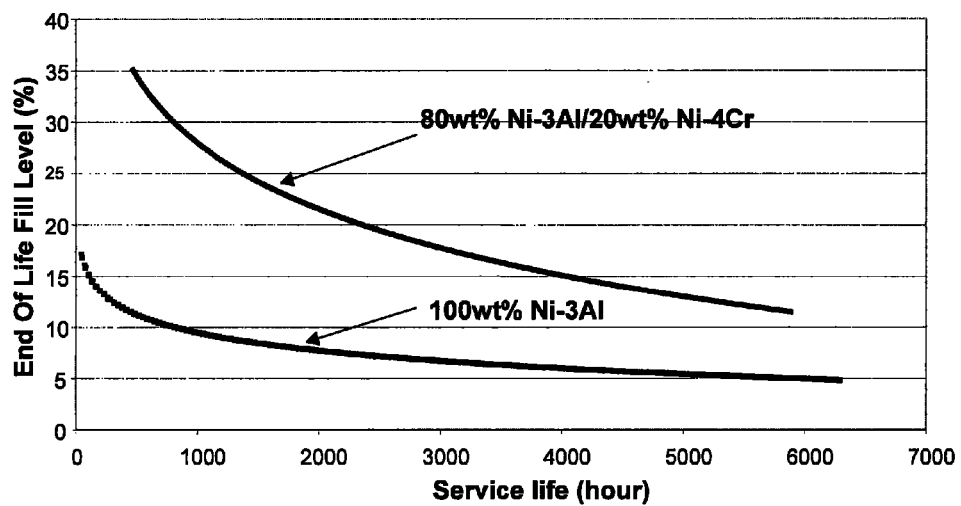
FIG. 4 shows a graph of fill level data for 80 wt % Ni-3Al/20 wt % Ni-4Cr anodes fabricating using the method of FIG. 2 and for 100 wt % Ni-3Al anodes.

FIG. 4 shows a graph of fill level data for the 80 wt % Ni-3Al/20 wt % Ni-4Cr anodes and for the 100 wt % Ni-3Al anodes after these anodes were tested in single cells under the above-described conditions. In FIG. 4, the X-axis represents the operating time of the single cells being tested in hours, while the Y-axis represents a percent end-of-life electrolyte fill level in the anodes. As shown, the electrolyte fill level in the 80 wt % Ni-3Al/20 wt % Ni-4Cr anodes over the operating time of 6000 hours was significantly higher than the fill level in the 100 wt % Ni-3Al anodes. In particular, the electrolyte fill level in the 80 wt % Ni-3Al/20 wt % Ni-4Cr anodes was about 35% after about 500 hours of operation and decreased to about 12% after 6000 hours of operation. In contrast, the electrolyte fill level in the 100 wt % Ni-3Al anodes was about 12% after about 500 hours of operation and decreased to about 5% after 6000 hours of operation.

The improvement in electrolyte retention in the 80 wt % Ni-3Al/20 wt % Ni-4Cr anodes is due to the formation of sub-micron pores during fuel cell operation, which are capable of retaining more electrolyte by capillary force than the pores in the 100 wt % Ni-3Al anodes. As discussed above, the improvement in electrolyte retention results in an extension of the operating life of the fuel cell, as well as in the performance of the cell, by preventing the drying out of the matrix and of the anode-matrix interface.

Although the formation of small pores is beneficial for retention of electrolyte in the pores of the anode electrode, unbalanced or excessive formation of sub-micron pores may result in excess amounts of electrolyte being stored in the anode, causing electrolyte flooding of the anode. For example, anodes formed from Ni-4Cr alloy powder without the use of Ni-3Al (hereinafter "100 wt % Ni-4Cr anode elements") experience such electrolyte flooding due to unrestrained formation of sub-micron pores in these anodes during fuel cell operation. The 80 wt % Ni-3Al/20 wt % Ni-4Cr anodes formed with the method of FIG. 2, however, have a balanced pore structure, which includes sub-micron pores formed during fuel cell operation, but which do not result in excessive electrolyte storage in the pores of the anode.

To demonstrate the effect of the improved pore structure of the 80 wt % Ni-3Al/20 wt % Ni-4Cr anodes prepared in accordance with the method of FIG. 2 and Example 1, the 80 wt % Ni-3Al/20 wt % Ni-4Cr anodes were tested in button cells to determine their polarization and to compare it to polarization of the 100 wt % Ni-4Cr anodes, which were also tested in button cells. The 100 wt % Ni-4Cr anodes tested for polarization were fabricated by mixing 100 wt % Ni-4Cr alloy powder with the mixture of additive materials, dispersant and solvent to form a slurry, tape casting the slurry to form a green sheet anode and drying the green sheet anode at a suitable temperature. Polarization of the anode elements tested was used for evaluating electrolyte flooding of the anode elements. In particular, anodes flooded with electrolyte exhibited high polarization due to high mass transfer resistance, while anodes that were not flooded exhibited low polarization.

The button cells in which the anodes were tested also included a lithiated NiO cathode and a LiAlO$_2$ matrix filled with 62Li$_2$CO$_3$/38K$_2$CO$_3$ electrolyte and were enclosed by a high purity alumina housing. During the testing, fuel gas comprising 72.8% H$_2$-18.2% CO$_2$-9% H$_2$O was passed through the anode, while oxidizing gas comprising 18.5% CO$_2$-12.1% O$_2$-66.4% N$_2$-3% H$_2$O was passed through the cathode. The tests in button cells were performed for more than 2,000 hours at a current density of 160 mA/cm$^2$ and at a low utilization of about 5%.

Figure 5:
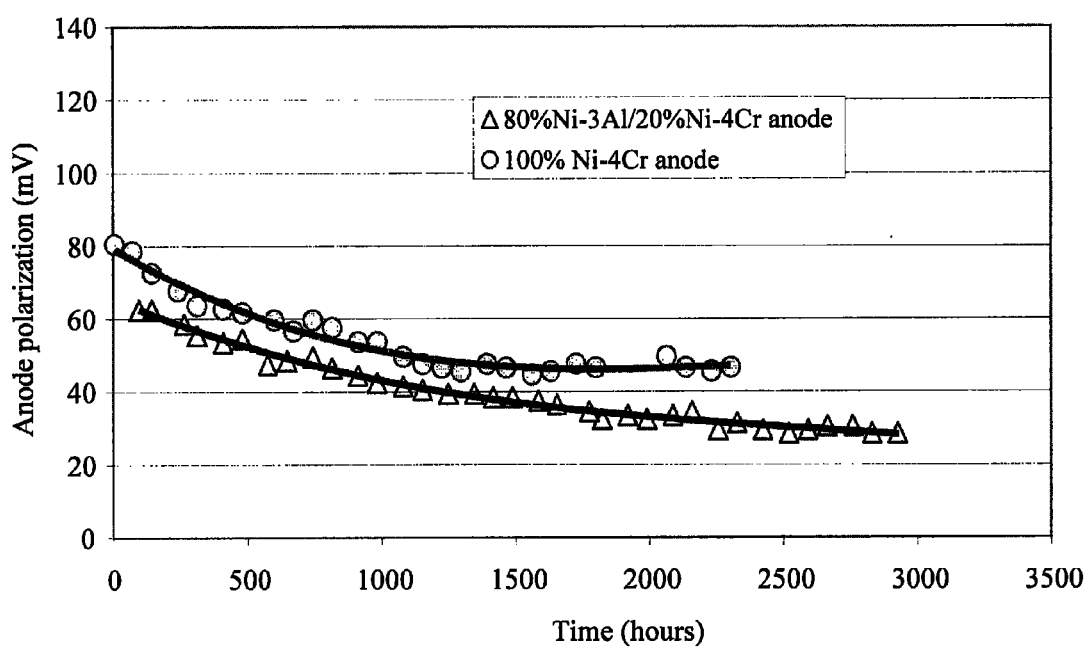
FIG. 5 shows a graph of anode polarization data for 80 wt % Ni-3Al/20 wt % Ni-4Cr anodes fabricating using the method of FIG. 2 and for 100 wt % Ni-4Cr anodes.

FIG. 5 shows a graph of anode polarization data for the 80 wt % Ni-3Al/20 wt % Ni-4Cr anodes and for the 100 wt % Ni-4Cr anodes which were tested at the above-described conditions. In FIG. 5, the X-axis represents operating time of the button cell being tested in hours, while the Y-axis represents anode polarization (at 160 mA/cm$^2$) in mV. As can be seen from FIG. 5, the polarization of the 80 wt % Ni-3Al/20 wt % Ni-4Cr anodes was lower than the polarization of the 100 wt % Ni-4Cr anodes during the entire operating time of the button cells.

As shown, both the 80 wt % Ni-3Al/20 wt % Ni-4Cr anodes and the 100 wt % Ni-4Cr anodes had a relatively high polarization at the beginning of operating life, i.e., less than 200 hours of operating time, due to some electrolyte flooding. In particular, the 100 wt % Ni-4Cr anodes exhibited polarization of 75 to 80 mV during the first 200 hours of operation, while the 80 wt % Ni-3Al/20 wt % Ni-4Cr anodes exhibited polarization of about 60 mV during the first 200 hours of operation. After the initial 200 hours of operation, polarization of the 80 wt % Ni-3Al/20 wt % Ni-4Cr anodes decreased significantly from 60 mV at 200 hours of operation to less than 30 mV at 3000 hours of operation. In contrast, polarization of the 100 wt % Ni-4Cr anodes decreased from about 75 mV at 200 hours of operation to about 48 mV at 1500 hours of operation and stayed at about 48 mV thereafter.

The higher polarization of the 100 wt % Ni-4Cr anodes is caused by poor gas diffusion through the anode due to electrolyte flooding. In particular, as discussed herein above, a large number of sub-micron pores is formed in the 100 wt % Ni-4Cr anodes during operation, particularly in the first 200 hours of operation, as a result of the oxidation/lithiation reaction of chromium in the Ni-4Cr alloy to form LiCrO$_2$. The formation of such large number of sub-micron pores results in excess electrolyte being stored in the pores of the anodes, thus limiting diffusion of the fuel gas through the anode.

In contrast, the 80 wt % Ni-3Al/20 wt % Ni-4Cr anodes have a balanced pore structure, such that the number of sub-micron pores formed during operation is controlled. The balanced pore structure in the 80 wt % Ni-3Al/20 wt % Ni-4Cr anodes allows a sufficient amount of electrolyte to be stored in the anodes without adversely affecting the active surface area of the anode and without reducing diffusion of the fuel gas into the pores of the anode.

As can be seen from the above results, the 80 wt % Ni-3Al/20 wt % Ni-4Cr anodes fabricated in accord with the method of FIG. 2 result in additional storage of electrolyte in the pores of the anodes without causing electrolyte flooding, thereby overcoming the disadvantages of the 100 wt % Ni—Al and the 100 wt % Ni—Cr anodes. These improvements in the pore structure and in the electrolyte storage capacity contribute to extension of the lifetime of fuel cells and to improvements in the performance of the cells.

It is understood that the amounts of Ni—Al and Ni—Cr used in the Ni—Al/Ni—Cr anodes are not limited to 80 weight % and 20 weight %, respectively, and can be varied depending on the application and requirements of the fuel cell. It is also understood that the Ni—Al and Ni—Cr alloy powders used in fabricating the anodes are not limited to having the 3 weight % aluminum content in the Ni—Al alloy and the 4 weight % chromium content in the Ni—Cr powder, and that the aluminum and chromium contents in Ni—Al and Ni—Cr, respectively, may be varied so as to achieve a desired pore structure in the anode.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. An anode electrode for use in a fuel cell comprising a porous electrode element formed from a first predetermined amount of Ni—Al alloy material having a predetermined aluminum content, and a second predetermined amount of Ni—Cr alloy material having a predetermined chromium content, wherein the first predetermined amount of Ni—Al alloy material comprises between 70 and 95 weight % of a total alloy weight and the second predetermined amount of the Ni—Cr alloy material comprises between 5 and 30 weight % of the total alloy weight.

2. An anode electrode in accordance with claim 1, wherein said aluminum content of said Ni—Al alloy material is between 2 and 4 weight % and said chromium content of said Ni—Cr alloy material is between 2 and 15 weight %.

3. An anode electrode in accordance with claim 2, wherein said Ni—Al alloy material comprises Ni-3Al alloy and said Ni—Cr alloy material comprises Ni-4Cr alloy.

4. An anode electrode in accordance with claim 2, wherein said Ni—Al alloy material comprises Ni—Al having a mean particle size of 20 μm and said Ni—Cr alloy material comprises Ni—Cr having a mean particle size between 5 μm and 15 μm.

5. An anode electrode in accordance with claim 1, further comprising at least one additive component including at least one of a binder and a plasticizer.

6. An anode electrode in accordance with claim 5, wherein said at least one additive component is first mixed with at least one of a dispersant and a solvent before being mixed with said Ni—Al alloy material and said Ni—Cr alloy material to produce a slurry and wherein said slurry is tape cast and dried at room temperature to form said anode electrode.

7. An anode electrode in accordance with claim 6, wherein said binder comprises an acryloid binder, said dispersant comprises fish oil and said solvent comprises reagent alcohol.

8. An anode electrode in accordance with claim 6, wherein said anode electrode has a thickness of 6.5 to 7 mils and drying said slurry at room temperature.

9. A fuel cell comprising:
an anode section;
a cathode section; and
an electrolyte matrix disposed between said anode section and said cathode section;
said anode section comprising a porous anode electrode formed from a first predetermined amount of Ni—Al alloy material having a predetermined aluminum content and a second predetermined amount of Ni—Cr alloy material having a predetermined chromium content, wherein the first predetermined amount of Ni—Al alloy material comprises between 70 and 95 weight % of a total alloy weight and the second predetermined amount of the Ni—Cr alloy material comprises between 5 and 30 weight % of the total alloy weight.

10. A fuel cell in accordance with claim 9, wherein said predetermined aluminum content of said Ni—Al alloy material is between 2 and 4 weight % and said predetermined chromium content of said Ni—Cr alloy material is between 2 and 15 weight %.

11. A fuel cell in accordance with claim 10, wherein said Ni—Al alloy material comprises Ni-3Al alloy and said Ni—Cr alloy material comprises Ni-4Cr alloy.

12. A fuel cell in accordance with claim 10, wherein said Ni—Al alloy material comprises Ni—Al having a mean particle size of 20 μm and said Ni—Cr alloy material comprises Ni—Cr having a mean particle size between 5 μm and 15 μm.

13. A fuel cell in accordance with claim 9, wherein further comprising at least one additive component including at least one of a binder and a plasticizer.

14. A fuel cell in accordance with claim 13, wherein said at least one additive component being mixed with at least one of a dispersant and a solvent before being mixed with said Ni—Al alloy material and said Ni—Cr alloy material to produce a slurry and wherein said slurry is tape cast and dried at room temperature to form said anode electrode.

15. A fuel cell in accordance with claim 14, wherein said binder comprises an acryloid binder, said dispersant comprises fish oil and said solvent comprises reagent alcohol.

16. A fuel cell in accordance with claim 9, wherein said anode electrode has a thickness of 6.5 to 7 mils.

17. A fuel cell in accordance with claim 9, wherein said fuel cell is a molten carbonate fuel cell.

* * * * *